Oct. 8, 1963  D. J. TESTON  3,106,219
PRESSURE CONTROL VALVE
Filed Nov. 2, 1960

INVENTOR.
DAVID J. TESTON
BY
*William F. Meninger*
ATTORNEY

United States Patent Office 3,106,219
Patented Oct. 8, 1963

3,106,219
PRESSURE CONTROL VALVE
David J. Teston, Cranford, N.J., assignor to Union
Carbide Corporation, a corporation of New York
Filed Nov. 2, 1960, Ser. No. 66,765
9 Claims. (Cl. 137—510)

The present invention relates to a pressure control valve and more particularly a valve adapted to control the flow of low temperature fluids.

For the storing and dispensing of many gases, it has become economically desirable and practical to maintain the gas in a low temperature liquid state and thence draw off the gas in vaporized form as required. Usually in a system for dispensing liquefied gases such as oxygen or nitrogen, the material is stored in liquid form at moderately high pressure; that is, at least as high as the operating pressure required to deliver at the upper end of a predetermined range of service pressures, and saturated with respect to such pressure. In this system it has been found desirable to maintain the liquid-vapor equilibrium for as long as possible. The liquid is generally discharged from the storage body or container under its own vapor pressure and is vaporized and supeheated by ambient atmosphere heat exchange.

Such storage in small quantities is made possible by limiting the rate of increase in heat content of the stored liquid due to heat leak. This is accomplished in the presently contemplated system by using a highly efficient insulation which will restrict heat leak into the stored liquid to a sufficiently low rate to prevent evaporative loss while the container is in transit, and during reasonably long idle periods. Effective insultaion is necessary because bottled storage at relatively high pressure reduces the margin between filling pressure and the setting of a relief device generally included in the system, and the decrease in pressure margin must be overcome by a corresponding reduction in heat inflow to the stored liquid. The particular setting of the relief device indicates the maximum operating pressure and thus constitutes the upper limit to the service pressure range.

In a low pressure system, for example, the service or withdrawal connection, to which the consumer line is attached, is in fluid communication with both the liquid and vapor phases of the storage container. In the connecting line between the vapor phase of the container and the service connection is generally interposed a back-pressure control valve which controls the flow of gas from the vapor phase to the service connection.

The function served by the fluid connection between the vapor phase of the container and the withdrawal line, and the back-pressure control valve contained therein is as follows. In spite of the provision of the most efficient types of insulation around the liquid container, unavoidable heat leak into the liquid hold chamber warms the liquid and causes evaporation. Such evaporation, if left unattended, would slowly raise the container pressure. If withdrawal of the chamber contents were made entirely from the liquid phase over a sufficiently extended period, this pressure rise would continue until vapor pressure reached the setting of a relief device. In order to avoid a loss of vapor under these conditions, provision is therefore generally made for the automatic withdrawal of a quantity of vapor from the storage chamber that is approximately equivalent to the heat leak into the container. To accomplish such withdrawal, the back-pressure control valve is disposed in the vapor phase connection for passing controlled amounts of vapor from the vapor space to the withdrawal connection. The back-pressure control valve is made responsive to the vapor phase pressure and is set to open when said vapor pressure exceeds a predetermined value slightly above the desired operating pressure in the container. Thus, when the container or vapor phase pressure rises above the setting of the back-pressure control valve as a result of heat leak, the valve opens automatically and vapor is released to the withdrawal connection for delivery to the consumer supply line. As vapor is released, the heat leak absorbed by the liquid is removed by the evaporation attendant to pressure drop in the container, and the liquid is thus returned to a pressure not exceeding the setting of the back-pressure control valve and at substantially saturation temperature.

Thus, it may be seen that when vaporized gas is being delivered from the container the back-pressure control valve maintains a relatively constant operating vapor pressure in the container and prevents the loss of vapor to the atmosphere through the relief device as the vapor pressure rises in the container due to the unavoidable heat leak into the liquid hold chamber. However, to prevent excessive drop in the vapor pressure above the liquid in the container, it is absolutely essential that this back-pressure control valve close or reseal quickly and positively with a minimum of pressure differential. That is, for example, in a system of the type described for which the nominal supply pressure or container delivery pressure is 70 p.s.i., the back-pressure control valve is set to open when the vapor pressure reaches about 77 p.s.i. and this valve must reseal positively when the vapor pressure has dropped to about 72 p.s.i.—a pressure differential of approximately 5 p.s.i. Positive valve action and tight sealing are essential if the nominal supply pressure of 70 p.s.i. and adequate flow capacity is to be maintained from the container. Should the control valve fail to reseal positively and vapor continues to be drawn off through the withdrawal connection, it becomes impossible to maintain adequate vapor pressure above the liquid to sustain adequate flow capacity at the nominal supply pressure because of insufficient withdrawal of liquid from the liquid hold chamber. It has been found that diaphragm operated valves are best suited to this purpose because of their greater sensitivity which provides the desired quick opening and quick closing of the valve unit.

A suitable diaphragm operated valve for the described purpose, in addition to providing the sensitivity and positive sealing characteristics required as outlined above, must conform to other requirements. Due to the low temperatures encountered in such low-boiling gas distribution systems, i.e., as low as −320 deg. F., there is a severe limitation on the types of materials which can be used for the sealing members as well as for the pressure sensitive diaphragm itself. Additionally, where the low-boiling gas being stored and distributed is oxygen, the combustibility problems associated therewith preclude the use of rubber or many of the plastic materials which are commonly regarded as acceptable for valve seats, diaphragms or sealing gaskets. Both the low temperature and combustibility problems can be solved through the combined use of certain kinds of metal valve sealing members and a non-combustible, non-embrittled metal reinforced or supported diaphragm since these could be regarded as non-combustible in an oxygen atmosphere and would remain relatively unaffected by the low temperatures.

However, the combined requirement of metal-to-metal seating and positive gas-tight sealing of the valve members produces problems of its own. In order to achieve a suitable gas-tight seal with metal-to-metal seating requires extremely close machining tolerances and super-high polish surface finishes on both the engaging valve parts. These are only found in commercially available valves at premium prices.

It is therefore an object of the invention to provide a valve adapted to control accumulated pressure of a vaporizable liquid. A further object is to provide such a valve for controlling the pressure of low temperature fluids. It is also an object to provide a valve characterized by a self-centering means for forming a positive fluid tight seal between the respective mating flow control members.

In brief, the pressure control device contemplated by the present invention consists of a valve body having a shallow cavity in one surface surrounded by an engaging rim; fluid inlet and outlet passages communicating with said cavity; and a cylindrical casing having opposed open and closed ends positioned with the open end in threaded engagement with said rim. A flexible diaphragm is peripherally compressed intermediate the casing and rim to define a pressure chamber in said cavity, said diaphragm being responsive to pressure variations within the chamber. An elongated valve stem associated with the pressure responsive diaphragm is urged toward said chamber by an adjustable resilient member compressively retained in the casing, the forward portion of said stem being provided with a rotatable face adapted to engage a mating seat member which is slideably retained in the valve body. Said seat constitutes the entrance opening to said outlet port and is formed of a relatively soft metal so that a fluid tight seal may be provided when the valve stem is urged by said resilient means into engagement with said valve seat.

Figure 1:
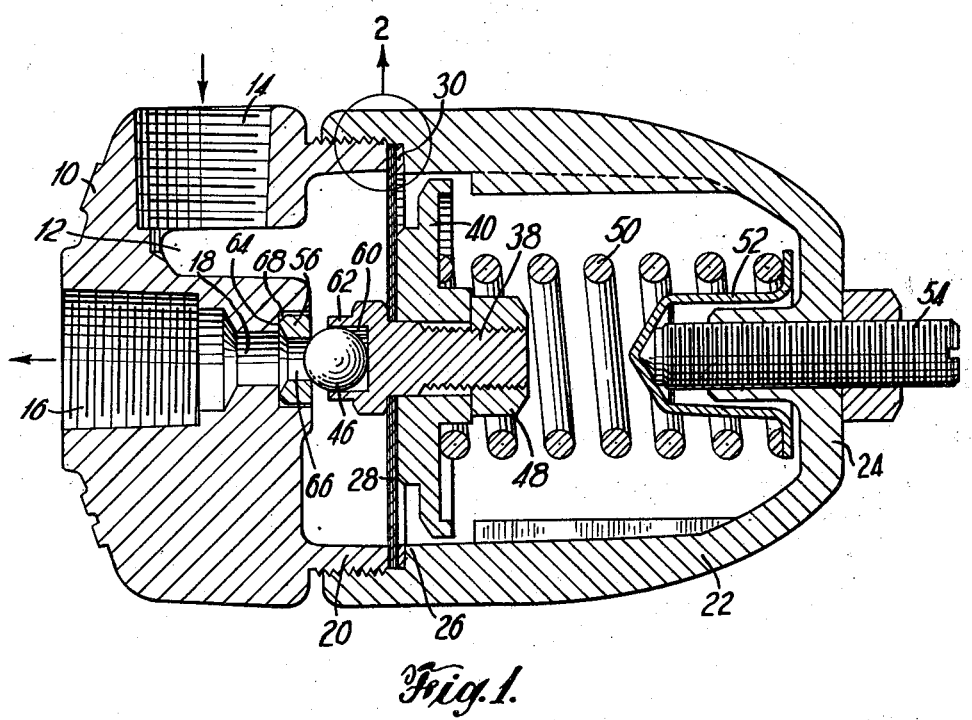
FIG. 1 is a longitudinal view in cross section of a valve embodying the present invention.

Referring to FIG. 1, a preferred embodiment of the invention includes a valve body 10 having a central cavity 12. A fluid inlet passage 14 communicates with said cavity 12 and is provided with threads to be engaged with a conduit from the source of the fluid to be controlled. An outlet port 16 is also communicated with the cavity 12 by way of a valved passage 18 which constitutes an important aspect of the invention and will be described herein in greater detail.

A circumferential rim 20 defines the opening to cavity 12 and is provided on the outer surface thereof with formed threads for engaging a similarly threaded bonnet or casing 22. The casing as shown is generally cylindrical in shape, having a rear wall 24 and a forward circumferential shoulder 26 at the open end. When properly engaged, said shoulder 26 is disposed adjacent the upper face of rim 20 to compressively retain the outer edge of a composite, flexible diaphragm 28, thereby defining a closed pressure chamber within cavity 12. A thin, metallic gasket 30 is also retained against the said shoulder and diaphragm to permit rotation of the casing 22 down against the diaphragm.

In order to obtain the desired sensitivity to pressure variation of the valve unit, it is necessary to use a diaphragm the flexibility of which would be maintained over the full range of operating temperatures. As previously pointed out, these temperatures may go as low as $-320$ deg. F. A thin metal diaphragm of certain metals, if used, would have the required strength and flexibility at these temperatures. However, the use of a metal diaphragm presents the problem of effecting a gas-tight seal at the clamping edges of the diaphragm. It has been found, though, that a plastic material such as polyethyleneterephthalate, commercially referred to as Mylar, will provide an effective gas tight seal at extremely low temperatures while still maintaining its flexibility. But Mylar alone has insufficient strength, unsupported, to withstand the contemplated 235 p.s.i. pressure which may be attained in the present liquid container during stand-by or no-flow periods, without "cold forming" of the diaphragm. Therefore, a combination of Mylar and metal diaphragms was selected for use in the valve of the invention.

Figure 2:
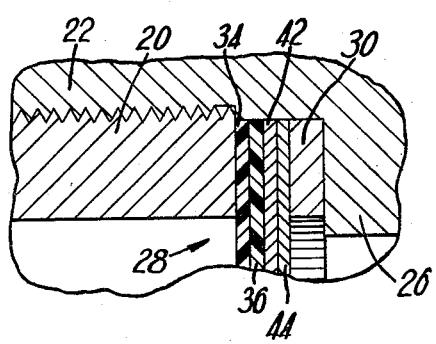
FIG. 2 is an enlarged fragmentary view in cross section of a portion of the valve shown in FIG. 1.

The novel diaphragm assembly as shown in FIG. 2, is comprised of a combination of four separate members. Diaphragms 34 and 36 are both approximately 0.0075 in. thick Mylar material. Two 0.0075 in. thicknesses of Mylar are preferred in order to provide the added squeeze necessary to effect a gas-tight seal between the casing 22 and the valve body 10, as well as between the valve stem 38 and back-up plate 40. It has also been found that a single Mylar diaphragm of approximately 0.015 in. thick material could be used satisfactorily.

Again referring to FIG. 2, diaphragms 42 and 44 are relatively thin metal discs of approximately 0.005 in. thick phosphorus bronze, spring tempered, which discs provide the needed added strength without being combustible or becoming too brittle at low temperature. A single metal disc of sufficient thickness to supply the required additional strength could be used, but such a member would tend to reduce the flexibility of the overall diaphragm assembly 28 and therefore reduce the sensitivity of the back-pressure control valve.

The circular diaphragm assembly 28, as shown in FIGS. 1 and 2, is provided with a center opening in which the valve stem 38 registers, said stem having a rotatable member, such as a hardened steel ball 46 engaged in the forward portion thereof and disposed within the pressure chamber 12. The metallic back-up plate 40 is urged into close sealing relation with the diaphragm by a suitable clamping means such as a nut 48 which may threadably engage the shank portion of stem 38 to squeeze the yieldable diaphragm into tight abutting contact with a circumferential shoulder of the valve stem thereby forming a gas-tight seal.

A coil spring 50 is compressively retained intermediate the rear face of plate 40 and cap 52, the latter being adjustable by a threaded stud 54 which may be rotatably positioned with relation to casing 22 for adjusting the spring loading on the diaphragm 28 to maintain a gas-tight seal of the valve members until a predetermined pressure is exceeded in the chamber 12. The spring loaded pressure adjusting means here utilized is well known and conventional in the art, and subject to many variations for providing the required variable sealing force on the valve stem.

As shown in FIG. 1, valve stem 38 is preferably formed with an elongated threaded shank, the forward face of which is provided with a circular recess 60 having a diameter slightly greater than the diameter of the hardened steel ball 46. The recess is sufficiently deep to permit said ball to be rotatably retained therein when the thin peripheral lip 62 is spun or peened inwardly. I have found, for instance, that with a ball having a diameter of .250±.005 inch, a recess having a diameter of about .260±.003 is adequate. When properly assembled, the ball will be loosely held so as to permit a degree of lateral movement thereof when pressed into contact with seat 56 and also permit a degree of rotation of the ball when not in sealing engagement. This permitted, rotation of the ball 46 minimizes the possible accumulation of defects on the ball seating surface since theoretically, a new sealing surface on the ball is presented to the seat 56 on each ensuing seating operation. While forward face could be contoured to the desired spherical shape, this would necessitate forming the entire valve stem from stainless steel and also necessitate expensive machining operations, all of which would add undesirably to the cost of the valve unit. Also, this latter method would not permit the freedom of movement which characterizes the rotatable and laterally rollable ball valve.

As mentioned above, the insertable ring seat member 56 sealably engages ball 46 to control fluid flow through the valve formed by said respective members in accordance with the pressure exerted against diaphragm 28 as a result of accumulated gas vapor in chamber 12. In order to assure a satisfactory seal at the mating valve surfaces, the ring 56 is loosely confined within a cavity 68 so as to be laterally slideable therein, said cavity having an inner circumferential shoulder 64 against which sealing contact is made. The ring, therefore, defines the entrance to the outlet passage yet is adjustable radially with said passage to permit proper alignment with the engaging ball of stem 38.

Figure 3:
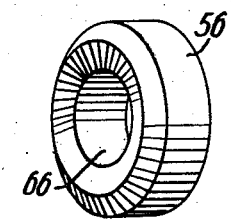
FIG. 3 is an enlarged isometric view of a preferred embodiment of the valve seat of the invention.

As illustrated in FIG. 3, the seat ring 56 is provided with a center opening 66 defining the fluid passage, the upper edge of the opening may be slightly beveled to receive ball 46, but because the ring member is preferably made from a relatively soft metallic alloy material which will slightly flow under load, after being brought together a number of times the seat will tend to form itself. In order that a sufficient pressure may be effected along the lower sealing surface, the seat is provided with a doubled beveled or V surface to form a thin annular ridge providing a circle of contact which exerts a high unit loading against shoulder 64. Since the ring 56 is adaptable to float or slide laterally within cavity 68 by virtue of the peripheral clearance therebetween, i.e., up to about 0.025 inch, it is necessary to accurately machine only the shoulder portion 64 with a smooth or polished surface. It is this feature which permits the valve to provide good fluid sealing qualities without the expense usually incurred through use of close tolerance, mating valve members.

It should also be noted that when the pressure in chamber 12 is sufficient to disengage the stem and its mating ring seal, the latter, although loosely confined in recess 68, is of sufficient thickness to be restrained from leaving the cavity, by contact with the ball.

I have found that to obtain the desired fluid seal at the lower V shaped ring surface, the ring material may be a relatively soft alloy such as white metal, which will tend to flow under load of the valve stem. By so doing, the V will gradually be deformed to define a narrow, smooth gas-tight surface against the mating cavity shoulder 64. A further advantage realized from the substantially line-to-line contact established by the V shaped surface on ring 56, is that the limited seal area presents less opportunity for particles of dirt or other solid foreign matter to become lodged therein and form imperfections in the seat.

What is claimed is:

1. In a pressure control device for vaporizable fluids including a body having a cavity therein, a diaphragm forming a gas-tight closure to said cavity and defining a pressure chamber for vaporized fluid, resilient means for urging said diaphragm against the pressure in said chamber, a passage for communicating said chamber with a source of the vaporized fluid, a second passage also communicated with said chamber providing an outlet for the fluid, control means interposed in said second passage and operable therewith, said means comprising: a stem associated with said diaphragm to be movable therewith, a forward face of said stem positioned in said chamber to close off the outlet of the second passage, the combination with the stem and second passage of a metallic annular sealing member having opposed ends, laterally slideably retained in said second passage defining the entrance thereto, said sealing member adapted at one of said ends to receive the forward face of said stem and to form an annular fluid tight seal therewith, the other of said ends having a V-shaped base and constructed of a relatively soft material which will flow under load to form a fluid tight seal with said outlet passage when said member is compressively urged by said stem under the force of said resilient means into said second passage thereby preventing fluid flow from the chamber through said second passage.

2. A pressure control device substantially as described in claim 1, wherein there are means positioned in said body for adjusting the pressure exerted by the resilient means against the diaphragm.

3. In a pressure control device for vaporizable fluids including a body having a cavity therein, a diaphragm forming a gas-tight closure to said cavity and defining a pressure chamber for vaporized fluid, resilient means for urging said diaphragm against the pressure in said chamber, a passage for communicating said chamber with a source of the vaporized fluid, a second passage also communicated with said chamber providing an outlet for the fluid and having a bored recess in the entrance thereof defining an annular shoulder, control means interposed in said second passage and operable therewith, said means comprising: a stem associated with said diaphragm to be movable therewith in response to pressure in said chamber, a forward face on said stem interposed in said chamber to close off the outlet of the second passage, the combination with the stem and second passage of an annular seating member laterally slideably received in the bored recess of the second passage, said seating member having an opening extending therethrough, the inlet face of said opening adapted to receive the forward face of said stem to provide a fluid tight seal therewith, the other face terminating in a V-shaped base disposed in abutting contact with said second passage shoulder to form a fluid tight seal with said shoulder, said seating member V-shaped base constructed of a relatively soft material which will flow under load when said member is compressively urged by said valve stem under the force of said resilient means into said second passage thereby preventing fluid flow from the chamber through said second passage.

4. In a pressure control device for vaporizable fluids including a body having a cavity therein, a diaphragm forming a gas-tight closure to said cavity and defining a pressure chamber for vaporized fluid, resilient means for urging said diaphragm against the pressure in said chamber, a passage for communicating said chamber with a source of the vaporized fluid, a second passage also communicated with said chamber providing an outlet for the fluid, control means interposed in said second passage and operable therewith, said means comprising: a stem associated with said diaphragm to be movable therewith, a rotatable engaging face on said stem positioned in said chamber to close off the outlet of the second passage, the combination with the stem and second passage of a metallic annular sealing member having opposed ends, laterally slideably retained in said second passage defining the entrance thereto, said sealing member adapted at one of said ends to receive the rotatable face of the stem and to form an annular fluid tight seal therewith, the other of said ends having a V-shaped base formed thereon and disposed in abutting contact with said outlet passage, said sealing member constructed of a relatively soft material which will flow under load to form a fluid tight seal with said outlet passage when said member is compressively urged by said stem under the force of said resilient means into said second passage thereby preventing fluid flow from the chamber through said second passage.

5. In a pressure control device for low temperature vaporizable fluid including a valve body having a cavity formed therein, a first passage communicating with said cavity to provide a flow of low temperature fluid thereto, second passage communicating with said cavity providing an outlet for the fluid, a casing threadably engaging the body to enclose the cavity, a flexible diaphragm assembly providing a closure to said cavity and defining a pressure chamber therein, the diaphragm compressively maintained at the outer edge thereof intermediate the engaged body and said casing to establish a fluid tight seal therebetween, adjustable resilient means for urging said diaphragm against the pressure in said chamber, control means interposed in said second passage and operable therewith, said means comprising: a stem associated with said diaphragm to be movable therewith, a forward face of said stem positioned in said chamber to close off the outlet of the second passage, the combination with the stem and second passage of a metallic annular sealing member having opposed ends, laterally slideably retained in said second passage defining the entrance thereto, said sealing member adapted at one of said ends to receive the forward face of said stem and to form an annular fluid tight seal therewith, the other of said ends having a V-shaped base formed thereon and disposed in abutting contact with said outlet passage, said sealing member constructed of a relatively soft material which will flow under load to form a fluid tight seal with said outlet passage when said member is compressively urged by said stem under the force of said resilient means into said second passage thereby preventing fluid flow from the chamber through said second passage.

6. A pressure control device substantially as described in claim 5 wherein said diaphragm comprises a first thin flexible disc of a low temperature resistant plastic material exposed to said cavity and a thin metallic back-up disc rearwardly abutting said first disc in supporting relation thereto.

7. A pressure control device substantially as described in claim 6 wherein the flexible plastic material disc is polyethylene terephthalate and the metallic back-up disc is Phosphor bronze.

8. For use in a pressure control device for fluids including a body having a cavity therein, a diaphragm forming a gas-tight closure to said cavity and defining a pressure chamber for fluid, resilient means for urging said diaphragm against the pressure in said chamber, a passage for communicating said chamber with a source of fluid, a second passage also communicating with said chamber providing outlet for the fluid, an improved fluid control means interposable in said second passage for operation therewith, said control means comprising a stem for association with said diaphragm to be movable therewith with a forward face of said stem positioned in said chamber, a metallic annular sealing member having opposed ends, said sealing member laterally slideably receivable in said second passage to define an entrance thereto, said sealing member adapted at one of said ends to receive the forward face of said stem and to form an annular fluid tight seal therewith, the other of said ends having a V-shaped base formed thereon for abutting contact with said second outlet passage, said sealing member constructed of a relatively soft material which will flow under load to form a fluid tight seal with said outlet when said member is compressively urged by said stem under force of said resilient means into said second passage thereby preventing fluid flow from the chamber into said second passage.

9. An improved fluid control means substantially as described in claim 8, wherein the forward face of said valve stem comprises a ball member rotatably retained in the stem.

References Cited in the file of this patent

UNITED STATES PATENTS

| | | |
|---|---|---|
| 1,301,719 | Lloyd | Apr. 22, 1919 |
| 1,985,770 | Edwards | Dec. 25, 1934 |
| 2,330,610 | Natter | Sept. 28, 1943 |
| 2,841,167 | Jacobson | July 1, 1958 |
| 2,888,946 | Barron | June 2, 1959 |
| 2,898,418 | Byam | Aug. 4, 1959 |
| 2,925,994 | Downs | Feb. 23, 1960 |
| 2,942,624 | Good | June 28, 1960 |

FOREIGN PATENTS

| | | |
|---|---|---|
| 337,322 | Great Britain | Oct. 30, 1930 |